(12) United States Patent
Perrone

(10) Patent No.: US 12,179,267 B2
(45) Date of Patent: Dec. 31, 2024

(54) METAL PRINTING AND ADDITIVE MANUFACTURING APPARATUS

(71) Applicant: Michael A Perrone, Worcester, MA (US)

(72) Inventor: Michael A Perrone, Worcester, MA (US)

( * ) Notice: Subject to any disclaimer, the term of this patent is extended or adjusted under 35 U.S.C. 154(b) by 0 days.

(21) Appl. No.: 17/847,793

(22) Filed: Jun. 23, 2022

(65) Prior Publication Data

US 2022/0410268 A1 Dec. 29, 2022

Related U.S. Application Data

(60) Provisional application No. 63/282,381, filed on Nov. 23, 2021, provisional application No. 63/242,196, filed on Sep. 9, 2021, provisional application No. 63/214,011, filed on Jun. 23, 2021.

(51) Int. Cl.
| | |
|---|---|
| *B22F 10/22* | (2021.01) |
| *B22F 10/368* | (2021.01) |
| *B22F 12/60* | (2021.01) |
| *B22F 12/90* | (2021.01) |
| *B33Y 10/00* | (2015.01) |
| *B33Y 30/00* | (2015.01) |

(52) U.S. Cl.
CPC ............ *B22F 10/22* (2021.01); *B22F 10/368* (2021.01); *B22F 12/60* (2021.01); *B22F 12/90* (2021.01); *B33Y 10/00* (2014.12); *B33Y 30/00* (2014.12)

(58) Field of Classification Search
CPC .......... B22F 10/22; B22F 12/90; B22F 12/60; B22F 10/368; B22F 12/53; B22F 12/50; B22F 2202/05; B33Y 10/00; B33Y 30/00
USPC .................................................. 222/593, 596
See application file for complete search history.

(56) References Cited

U.S. PATENT DOCUMENTS

| | | | | |
|---|---|---|---|---|
| 4,541,867 A | * | 9/1985 | Neelameggham | .... C21C 7/0006 75/328 |
| 8,444,028 B2 | * | 5/2013 | Rasa | ....................... B22F 9/082 266/236 |
| 9,393,581 B2 | * | 7/2016 | Rasa | ..................... B05B 12/004 |
| 10,189,081 B2 | * | 1/2019 | Pascall | ................... B33Y 50/02 |
| 11,020,797 B2 | * | 6/2021 | Pascall | ................... B33Y 30/00 |
| 2017/0120513 A1 | * | 5/2017 | Brennan | ................. B29B 7/404 |
| 2020/0139624 A1 | * | 5/2020 | Khondoker | ........... B29C 64/118 |

* cited by examiner

*Primary Examiner* — Jessee R Roe
*Assistant Examiner* — Michael Aboagye
(74) *Attorney, Agent, or Firm* — Armis IP Law, LLC

(57) ABSTRACT

A molten metal print deposition device includes a reservoir in fluid communication with a deposition head for controlled deposition of a molten metal print medium defined by molten feedstock, and a capillary structure adapted to maintain the molten feedstock from the melt reservoir in a fluidic state for directing and depositing the feedstock onto a substrate. A print medium is defined by an alloy heated to a fluid state in a temperature range defined by but above a liquidus and solidus. A thermal source and control circuit maintain the molten feedstock at a temperature above the liquidus of the print medium during deposition.

14 Claims, 9 Drawing Sheets

METAL PRINTING AND ADDITIVE MANUFACTURING APPARATUS

RELATED APPLICATIONS

This patent application claims the benefit under 35 U.S.C. § 119(e) of U.S. Provisional Patent Application No. 63/214,011, filed Jun. 23, 2021, entitled "SEMISOLID ALLOY PRINTING AND ADDITIVE MANUFACTURING APPARATUS," and U.S. Provisional Patent Application No. 63/242,196, filed Sep. 9, 2021, entitled "SEMISOLID ALLOY PRINTING AND ADDITIVE MANUFACTURING APPARATUS," and U.S. Provisional Patent Application No. 63/282,381, filed Nov. 23, 2021, entitled "SEMISOLID ALLOY PRINTING AND ADDITIVE MANUFACTURING APPARATUS," all incorporated herein by reference in entirety.

BACKGROUND 3-dimensional (3D) printing and additive manufacturing has evolved substantially in recent decades, due in part to the decreasing cost of printing hardware and evolving technology which allows for broadening groups of materials which may be printed. Once reserved for hardcopy ink printing, the computer or robotic controlled print medium has evolved from ink to robust forms of controlled extrusion and deposition for manufactured objects.

SUMMARY

A semisolid alloy additive manufacturing device and print method provides more robust and cost efficient additive manufacturing of printed articles from metals, salts, ceramics and their alloys in various combinations. The device ensures that the fluid, thermal and pressure boundary conditions are satisfied to allow deposited material to exhibit fluid properties desirable for additive manufacturing. A brush wettable by a molten species or alloy is employed to deposit molten material on a workpiece from a melt reservoir while additionally controlling the temperature of the brush and the workpiece, and controlling the temperature drop across the melt reservoir and/or the brush or capillary structure conveying the print medium.

A semisolid alloy print deposition device includes a melt reservoir in fluid communication with a deposition head for controlled deposition of a molten feedstock, and a geometry for maintaining favorable printing conditions around the deposition head, and especially between the boundaries of the fluid bead between deposition head and substrate. A feed wire is formed from a feedstock alloy with a semisolid range.

Configurations herein are based, in part, on the observation that 3D printing is evolving as a viable manufacturing method for individual articles for which conventional approaches required individual dies, molds and mass-production casting, stamping or injection equipment. Unfortunately, conventional approaches using purely plastic and polymer based print stock, popular with lower cost home and hobbyist 3D printers, suffer from the shortcoming that they generate articles of limited strength due to the plastic nature of the feed filament. Many applications require the strength and resilience of metal composition. Accordingly, configurations herein substantially overcome the shortcomings of conventional 3D printing and additive manufacturing by providing a metal based printing approach employing semi-solid alloys for rendering a printed article with substantial definition and fidelity through alloy compositions, temperature modulation around a liquidus and solidus threshold of the alloy, and extrusion/deposition techniques that form a well-adhered homogeneous workpiece easily releasable from the print bed or deposition surface. A first course or layer releasably adheres to the print bed, and collectively forms an accumulating substrate with good wetting to previously deposited print medium, as well as the print bed.

The disclosed approach also applies to a myriad of 3 dimensional easily extrudable substances such as polymers, and more recently, to metal based substances and even ceramics. Conventional metal printers represent a major capital investment of upwards of 500K to purchase, further compounded by high operating costs. Other cheaper alternatives require substantial protective hardware like ventilation, splatter shields and UV protection to be purchased and installed along with the printing system. Also due to hazmat considerations, the metal powders currently used are roughly 10 times more expensive than the raw metals. The disclosed approach avoids use of metal powders and electrical arcs. Metal wire, as employed herein, can approach the cost of the raw metal at scale, and the safety requirements of the various configurations are be similar to those required for CNC machines.

In an example arrangement, a molten metal print deposition device includes a reservoir in fluid communication with a deposition head for controlled deposition of a print medium defined by molten feedstock, and a capillary structure adapted to maintain the molten feedstock from the melt reservoir in a fluidic state for directing and depositing the feedstock onto a substrate. A thermal source and control circuit maintain the molten feedstock at a temperature above the liquidus of the print medium during deposition prior to passage out of the nozzle and onto the brush or capillary structure where it may pass below the liquidus without risk of clogging.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
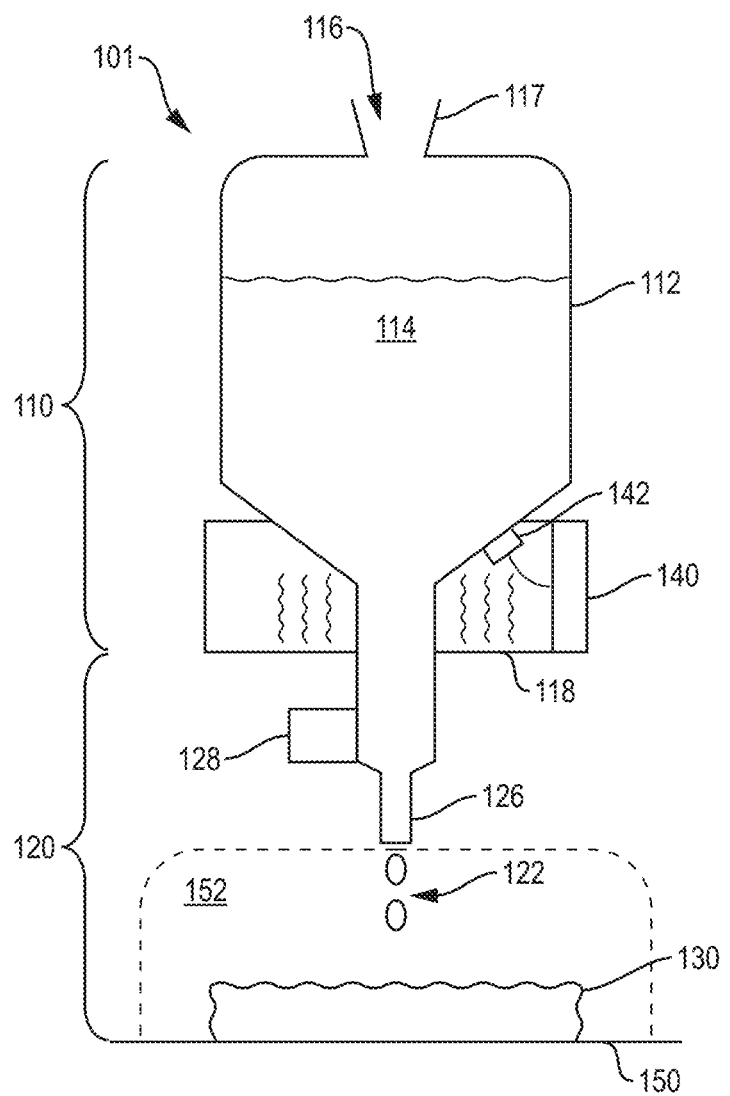
FIG. 1 is a context view of an additive manufacturing/3-dimensionalprinting apparatus suitable for use with configurations herein.

Configurations depicted below present examples of printing devices using a metal or metal alloy feedstock for generating printed articles. The disclosed approaches show various features in different configurations; a number of features may be combined in alternative or exclusive arrangements depending on a desired cost, performance or characteristics of the printed article.

Fused Filament Fabrication was developed in the 1980's as a technique for 3D printing thermoplastic materials layer by layer. Applying this same technique to metal has met with challenges for a number of reasons. Firstly, reactive wetting models describing metal are vastly different from the standard wetting models used for water or polymers. Secondly, the range of viscosity and surface tension experienced by molten metallic systems differ drastically from those experienced by thermoplastics, making the so-called Plateau-Rayliegh instability prohibitively difficult to overcome. Third, the oxidation of the surface and corrosion of the nozzle must be taken into account. Fourth, metallic systems can experience granular jamming which is almost entirely alien to thermoplastic systems, except for composites with solid powders added. Fifth, the material properties of molten metals typically have much more sensitive dependence on temperature than thermoplastics do, viscosity for example ranging over many orders of magnitude in as little as a few degrees Celsius depending on the alloy.

Metallic glasses are an exception to most of the above issues, exhibiting viscous properties which can be comparable to thermoplastics printing with metallic glass has been attempted, but in that case, the high cooling rates required prevented oxide layer breakdown, diffusion and bonding between the subsequent layers of the part. Virtually any melt pool below the deposited material would otherwise have a chance to recrystallize. In these cases, ultrasonic agitation was required to promote interlayer bonding, but ultrasonic agitation also led to the dissolution of nozzle materials in the metallic glass over time, despite the high viscosity and relatively lower diffusion rate. Ultimately this concern is engineerable, but the prohibitively high cost of compatible metallic glass and ultrasonic agitation systems coupled with the low resolution presently achievable has so far prevented this process from being viable. A metallic brush system may be able to operate with a wider range of metallic glass alloys, and can break the oxide coating between layers mechanically instead of with ultrasonic energy to provide a strong inter-layer bond while being more robust and far more cost effective than ultrasonic agitation.

Other metals are completely liquid with little to no semisolid range. For this case, welding methods like Wire Arc Additive Manufacturing (WAAM) or welding using a more stable plasma electrode have been effective to produce near net shape parts, because the weld bead simply solidifies too quickly for the thin liquid metal to flowanywhere but its intended location. The high amperage also probably helps confine the metal to the proper location via a Z-pinch effect, and the wire itself adds a boundary condition to help constrain the position of the weld bead. These methods either suffer from excessive UV emission and defects as in WAAM, or excessive cost as with plasma or tungsten electrode welding. All of these cases suffer from low resolution, and must be paired with additional CNC machining to achieve acceptable dimensional accuracy for many engineering applications. The disclosed brush can be usable to achieve higher resolution and lower defect counts than welding-based methods with a cheaper overall process, because it tames the Plateau-Rayliegh instability by blocking pinch-off with solid capillary structures, so that printing can be done without high energy, chaotically unpredictable electrical transients that lead to splattering and defects in welding. One additional consideration when printing with thin fluids is capillary forces. Conventional approaches have encountered an issue that the capillary pressure of fluid wetting onto a substrate tends to pull thin molten eutectic alloys through the nozzle in a variable manner, dependent on the specific shape of the meniscus formed due to surface roughness as well as on the movement speed of the nozzle. Other efforts have demonstrated an electrochemical 3D printer for which the meniscus was stabilized by a sponge in the fluid reservoir, and probably also by the electrical current through the water, which tends to stabilize bridging structures in water. The sponge works because the meniscus at the sponge surface applies an equal and opposite capillary pressure to that developed by the wetting meniscus at the nozzle tip, and both can vary rapidly in response to each other to balance forces. Alternatively, it is possible to use active force balancing to control deposition of thin fluids at the nozzle tip, but the use of a sponge is simple and elegant for most applications, with the mode of operation of a felt tip pen or marker being a reasonably close analogy.

Semisolid alloys are often erroneously compared to thermoplastics, but their physical properties differ in significant ways which are difficult to overlooked when used for 3D printing. They appear viscous and shear thinning when between their solidus (where all stable phases are solid) and liquidus (where all stable phases are liquids) temperatures: in such a state they are partially molten, and behave more like wet sand than thermoplastic. This is a stable state for off-eutectic and peritectic compositions, and between these two temperatures, such alloys are never fully solid or fully liquid, instead composed of multiple phases, some liquid some solid, with equal interdiffusion coefficients keeping them in equilibrium that way. They are generally not viscoelastic or compressible as thermoplastics are and the liquid portion tends to have low viscosity and strong cohesion/surface tension, where thermoplastics have high viscosity and lower surface tension. When thermoplastics are printed using fused filament fabrication, their fluid properties and glass transition temperature range enable the filament to bulge out as it is pressed into the hot end, forming an effective sealing surface somewhat like the plunger in a syringe. This allows the plastic ahead of that seal to be pressed through the nozzle tip by the wire feed mechanism. Semisolid metals cannot do this (unless the alloy undergoes creep in the solid state near its melting point), because under an applied pressure in an unsealed environment, the liquid phase is thin enough to be pressed out of the solid phase and leak out of the system, leaving the solid phase agglomerated and bonded together in a solid mass and often stuck to the wall of the hot end or clogging the nozzle. These separated phases then find new thermodynamic equilibria, but the timescale of their separation during 3D printing is typically faster than diffusion can compensate. This is called granular jamming, which is a frequent cause of unsatisfactory results in attempts to print or deposit metal-based print mediums.

FIG. 1 is a context view of an additive manufacturing/3-dimensional printing apparatus suitable for use with configurations herein. Referring to FIG. 1, a molten metal print deposition device includes a print head 101 having a reservoir 112 in fluid communication with a deposition head 120 for controlled deposition of a print medium 122 defined by molten feedstock 114 of a feedstock alloy. The reservoir 112 is part of a feed system 110 including a feed inlet or entry 116 for receiving fresh feedstock, and a heating unit 118 to form the molten feedstock 114 in a fluid or semi-solid state.

The deposition head 120 includes a capillary structure 126 adapted to maintain the molten feedstock from the melt reservoir (reservoir 112) in a fluidic state for directing and depositing the feedstock onto a substrate 130. A thermal source 128 maintains the molten feedstock 114 as a fluid print medium 122 at a temperature above the liquidus of the print medium as it passes through the capillary structure 126 during deposition.

The feed system 110 further comprises a control circuit 140 for heating the reservoir 112 and a temperature sensor 142 connected to the control circuit 140 and in communication with the reservoir 112. Melting logic in the control circuit heats the reservoir based on a temperature signal from the temperature sensor and a thermal differential of the molten feedstock during deposition. The reservoir 112 may have a separate heat source 118, along with the print bed, Alternatively, there may be a deposition thermal source 128, depending on the thermal properties and a flow/extrusion distance through the deposition head 120, depending on the geometry and composition of the extruder.

A feedstock transport 117 is configured for transporting feedstock into the reservoir, and may include a filament fiber and reel delivery or a hopper for granular material. Particular configurations may include a seal at the entry 116 of the feedstock into the reservoir 112, to form a pressure vessel defined by the reservoir, the seal and the capillary structure, which assists in moderating a flow rate of the molten feedstock via the capillary structure. Volumetric displacement pressure, capillary pressure, magnetic force and other suitable fluid dynamics assist a controlled flow of the fluid medium 122, discussed further below. For some designs the extrusion control will be at the point of deposition in the deposition head 120.

Pressure control may be achieved with a single positive pressure source tank, compressor, solenoid valves, venturi tubes, flow control valves with favorable flow characteristics and pressure sensors, so that control logic can apply either positive or negative pressure to the melt reservoir with a fast response time and reduced nonlinearity, affecting the flow speed of the print medium.

In an example arrangement, the transport 117 is defined by a wire feed for transporting a feedstock wire into the reservoir, such that the seal surrounds the wire; and a sealing liquid between a surface of the feedstock wire and the seal forms a closed vessel for pressure containment. Alternatively, the sealing liquid may be replaced by a sprung metal seal as in a car piston, an elastic seal like silicone o-rings, or a liquid seal.

Figure 2:
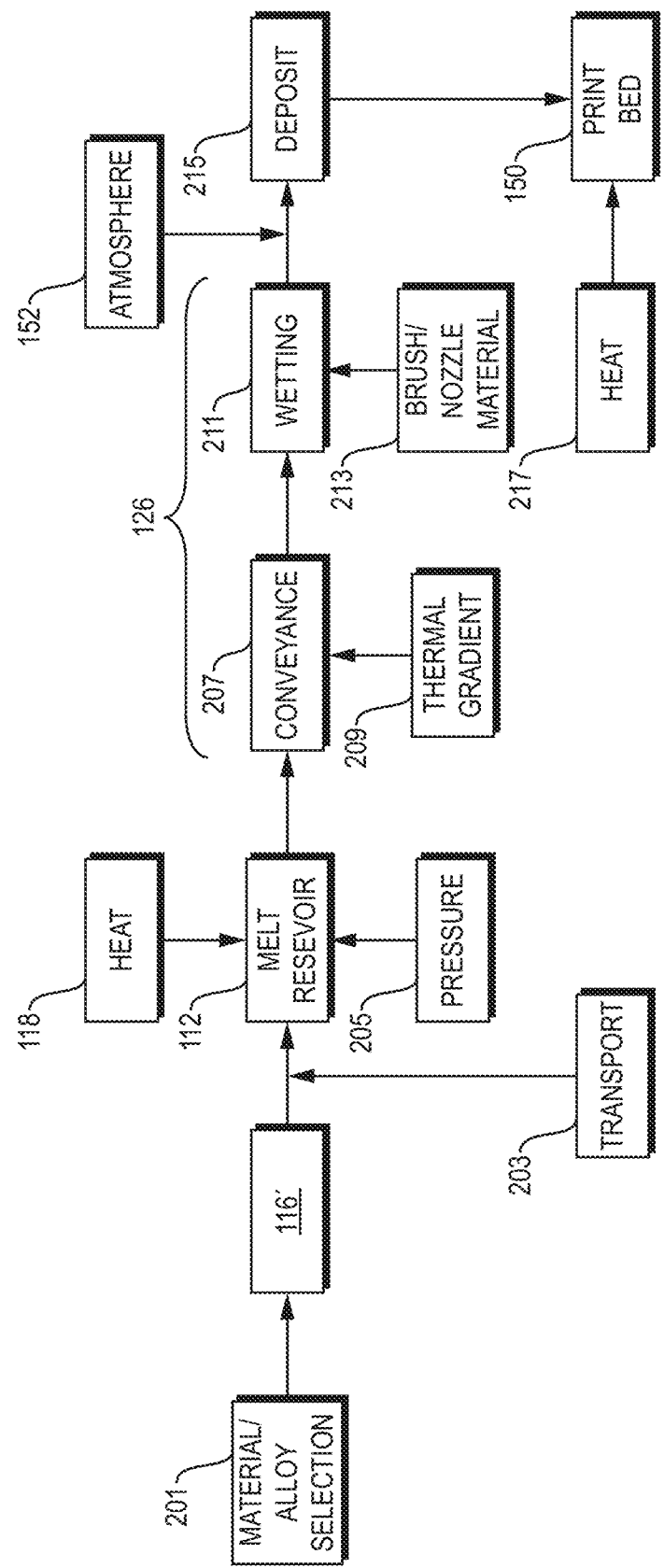
FIG. 2 is a flowchart of additive manufacturing of metal articles using the apparatus of FIG. 1.

FIG. 2 is a workflow diagram of a method of additive manufacturing for metal articles using the apparatus of FIG. 1. Referring to FIGS. 1 and 2, a method for additive manufacturing includes, at step 201, selecting a feedstock alloy based on a composition having a solidus and liquidus properties, which determine the thermal control and particularly, the thermal gradient, or temperature drop, as the print medium passes thorough the capillary structure. Surface chemistry with the brush/print bed and galvanic properties also play a role. Certain sets of materials will work with each type of brush material. Particular configurations employ a eutectic feed material, which is an alloys that has a lower melting point than its component ingredients. Off-eutectics generally have a solid and liquid phase above their solidus temperature and below their liquidus temperature, and will retain those same phases during solidification and cooling.

The raw feedstock 116' is conveyed to the reservoir 112 by a transport mechanism 203. The reservoir invokes the heating element 118 adapted to melt the feedstock into a liquid or semisolid form to define the print medium 122, where the feedstock 114 exhibits both a solidus temperature and a liquidus temperature.

The control circuit 140 may also maintain a desired pressure 205 in the reservoir, where the pressure is responsive to delivered feedstock by a sealing engagement of incoming feedstock with an outer wall of the reservoir. The volume of incoming feedstock increases the pressure for volumetric displacement of the print medium through the capillary structure 126.

The heating element 118 heats the feedstock 114 above the solidus temperature to achieve a fluid form defining the print medium 122. A conveyance mechanism 207 receives the fluid form, typically a semisolid phase of the alloy, and delivers it for flowing the print medium 122 via the capillary structure 126. The conveyance mechanism ensures that, until the fluid reaches the capillary structure, it is fully molten. Once it is on the capillary structure, but not prior, then it may fall into a semisolid state. The capillary structure defines a thermal gradient 209 indicative of cooling the print medium 122 during passage. The thermal gradient is generally determined by the geometry of the capillary structure, the thermal conductivity of the capillary structure and the feedstock alloy, and the temperatures of the reservoir and the print substrate, which are both controlled as defined herein. The conveyance mechanism 207 invokes one or more of several approaches. It may involve flowing the print medium through the capillary structure based on volumetric flow from displacement of incoming feedstock, as the volume of incoming filament displaces fluid print medium 122. Conveyance may also be achieved from opposed magnetic sources adjacent the capillary structure, and applying an electrical current to electrodes adjacent the magnetic sources for inducing a magnetohydrodynamic force on the print medium 122.

Conveyance includes controlling temperature along the capillary structure 126 based on the reservoir temperature and the thermal gradient 209. The thermal gradient is controlled by geometry and thermal conductivity of the capillary structure, the thermal conductivity of the feedstock alloy, and the temperatures of the melt reservoir and the print bed/substrate (which are typically in thermal contact) of the print medium during passage through the capillary structure. Precise thermal control provides a balance for preventing clogging from solidified particles of print medium and liquid print medium continuing to flow from a deposited location on the accumulating substrate. The open porosity of the capillary structure prevents clogging.

Collectively, conveyance through the capillary structure may be defined by an extruder for use with metal wire, bar or other feedstock where the entrance to the extruder for the feedstock wire is coated with a thermally stable sealant liquid and is below the solidus temperature or melting point of the metal feedstock but above the melting point of the sealant liquid or within its glass transition temperature range, enabling volumetric extrusion and preventing the separation of liquid and solid phases in the metal wire as it melts. Further comprising a temperature gradient towards the nozzle tip, where the extruder hot end temperature is greater than the liquidus or melting point of the molten feedstock alloy, for best extrusion performance. Thermal control then causes the temperature to fall below the liquidus temperature at the tip of the brush, when the brush contacts the substrate.

The capillary structure 126 ends with a surface interaction with the printed substrate, and is affected by wetting 211 of the capillary structure and wetting of the accumulated substrate 130. The capillary structure is generally formed from at least one of a set of parallel, elongated strands of a material selected based on a solubility of the material in the print medium, a nozzle having a shape, and a sintered powder with an open porosity. The result is a brush or nozzle 213 for controlled release of the print medium 122, or alternatively, a converging diverging nozzle or pen-type nib structure.

The terminus of the capillary structure 126 deposits the print medium 122 onto an accumulating substrate at 215. The accumulating substrate 130 resides on the print bed 150 and includes previously deposited print medium for forming a printed article 130', where the combination of print bed and accumulating substrate are heated to a temperature favorable for printing. An atmosphere 152 for eliminating oxygen or other reactive gases may be provided to avoid contamination or compromise of the solidifying print medium. A measure of total heating along the deposition path to the print bed is based on the thermal gradient and the solidus temperature for achieving a semisolid state of the print medium when deposited onto the accumulating substrate for maintaining a deposited position and structure based on the printed article. The fluid state of the deposited print medium 122 should rapidly solidify or firm, and should not flow or distort as it contacts the substrate 130 or print bed.

Alternate configurations may include a liquid environment surrounding the print bed for preventing oxidation. The liquid environment may include the printed article and/or the brush. A deep eutectic solvent, ionic liquid or molten salt may be employed for partial or complete submersion of the print bed and printed article. If the liquid has appropriate electrical characteristics, oxidation is further mitigated upon print medium deposition by cathodic protection and/or chemical removal of oxide layers.

Actuators, slides, rods and/or belts provide a displacement mechanism for actuating the capillary structure relative to the print bed for defining a pattern of deposited material according to a predetermined structure of a printed article. Either may move relative to the other according to a predetermined deposition pattern for forming the printed article.

Figure 3:
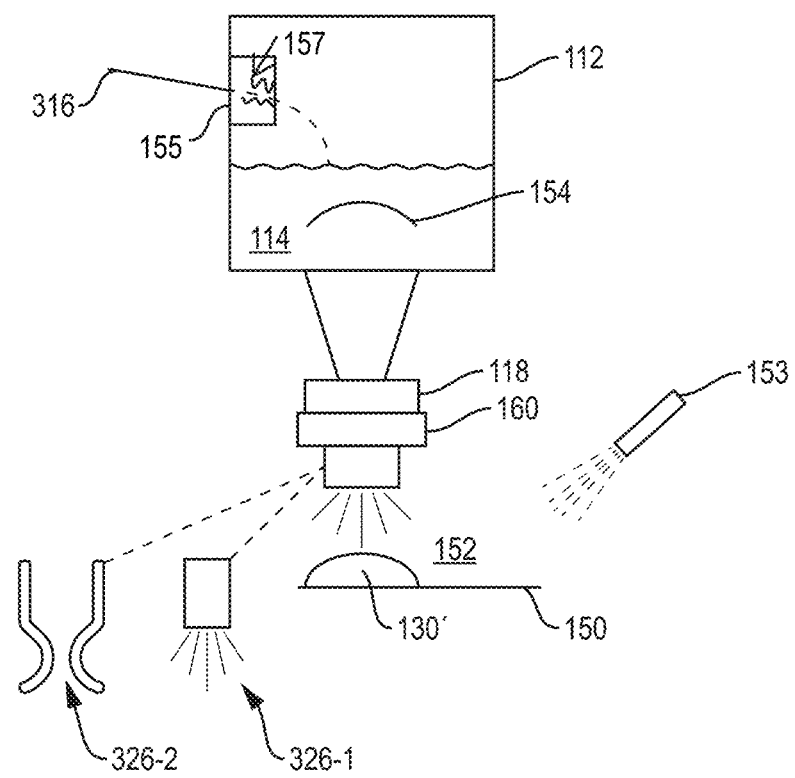
FIG. 3 is a schematic view of a printing apparatus according to the approach of FIGS. 1 and 2.

FIG. 3 is a schematic view of a printing apparatus according to the approach of FIGS. 1 and 2. Referring to FIGS. 1-3, an alloy feed wire 316 defines the feedstock 116 into the reservoir 112. A seal 155 maintains a resilient or tight engagement around the feed wire 316 to form an enclosed volume of pressure 205 in the reservoir. A sealant liquid 157 may be disposed around the seal and coat a wire feedstock, such that the sealant liquid has a solidus temperature below a melting point of the feedstock. A baffle 154 may be suspended in the reservoir above an outflow to the capillary structure and extends over an area above the outflow. The baffle affects fluid currents in the reservoir 112 for dispersing the molten feedstock. The thermal source 118 is configured for maintaining the thermal gradient 209 of the print medium between the reservoir to the substrate 130 and finished article 130' to accommodate a cooling effect while maintaining a temperature above the liquidus of the print medium.

A drive mechanism 160 may surround or adjoin the capillary structure 126 for magnetic propulsion or extrusion of the print medium 122, discussed further below.

An atmospheric enclosure or region 152 around a print volume may be defined by or adjacent to an exit of the capillary structure for depositing the print medium and a print bed 150 accumulating the deposited print medium, where the atmospheric enclosure has an oxygen mitigation control 153 for reducing oxygen present in the print volume. In a particular example, the oxygen mitigation control may include an electrolysis source, water, and an oil layer on the water for displacing oxygen based on hydrogen fueled electrolysis.

The region 152 may be further enhanced by an enclosed atmosphere around the print volume with the ability to pull vacuum, add inert atmosphere or use getters to scrub oxygen, so that surface oxidation is reduced to acceptable levels during operation. This may include a hot nickel, palladium or platinum wire, and hydrogen from water electrolysis, invoking an oil layer above the water at the hydrogen inlet to the print volume, to minimize water evaporation into the print volume. This enables inexpensive refilling with water instead of expensive replacement of transition metal, magnesium or rare earth getters. An outlet external to the printer may vent oxygen for minimizing potential fire hazards. Desiccants may be employed to capture the generated moisture, including at least one of CaCl and MgCl. A molten salt, ionic liquid or deep eutectic solvent bath may also be added to the print volume for oxidation mitigation.

Within the reservoir 112, a fluidic exit from the reservoir exit may be above the molten feedstock 114 material, or on top of a conic or mounded structure so that fluid sloshes around the outlet and not over the outlet, with capillary structures to pull liquid feedstock material up from the melt pool and out through the exit so that it may be released in a controlled manner at the deposition head.

The baffle 154 may define an "umbrella" structure which prevents feedstock material from falling on top of the melt reservoir outlet, therefore preventing spikes in the fluid pressure at the deposition head.

The melt pool may include a powder, sponge, wire or sintered inserts with open porosity which is wettable by the molten feedstock material, but which has low solubility in the molten feedstock at the working temperature of the deposition system. The result is that the feedstock is prevented from sloshing by capillary forces and the fluid properties of the composite with little to no degradation of the physical properties and composition of the feedstock material, or so that whatever dissolution does occur actually improves the physical properties and composition for a desired application.

The capillary structure 126 may also be a modular, replaceable element, such as a brush 326-1 with parallel strands or filaments, or a nozzle 326-2 which widens towards the end instead of a brush, so that granular jamming cannot occur as the material passes into the semisolid temperature range from a fully liquid state as it flows through the nozzle. It is also beneficial to have a nozzle with low enough surface roughness or appropriate composition to inhibit nucleation of metal crystals on the nozzle during printing. Any suitable geometry may be applied for the capillary structure, such as the nib of a fountain pen or roller of a ball pen. The use of a converging/diverging nozzle 326-1 avoids clogging by inhibiting mechanical bridging associated with granular jamming. The brush structure 326-1 may be further augmented by a shaped, slotted nozzle shown further below in FIG. 11. Grooves or slots define clogging-resistant capillary channels for the print medium flow.

Figure 4A:
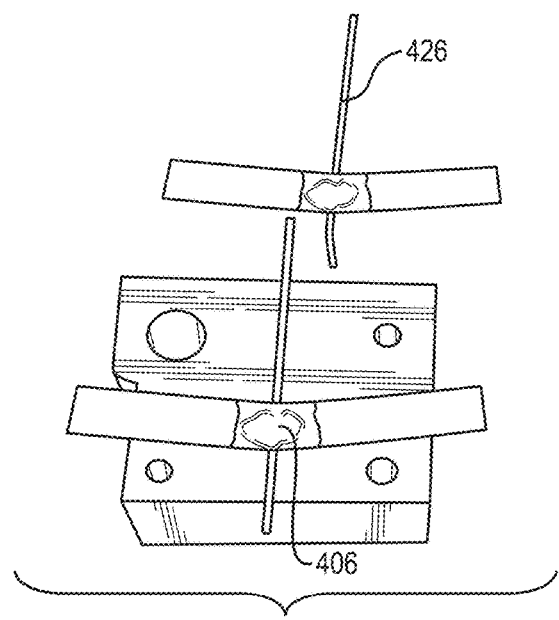
FIGS. 4A and 4B are diagrams of a capillary structure and MHD electrodes for delivering the print medium of FIGS. 1-3.
Figure 4B:
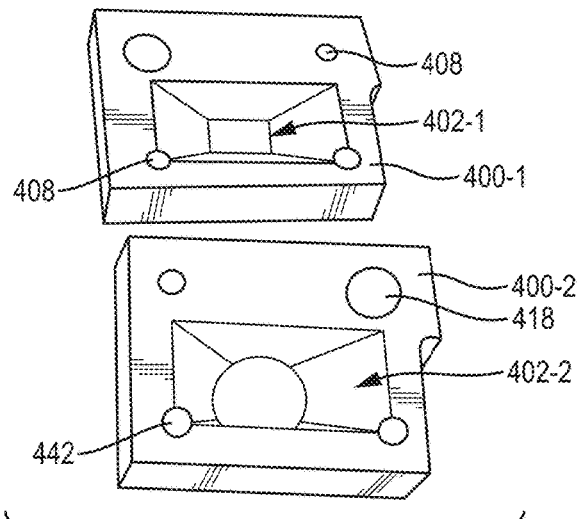

FIGS. 4A and 4B are diagrams of a capillary structure for delivering the print medium of FIGS. 1-3. Referring to FIGS. 1-4A, the capillary structure 126 may further includes a plurality of elongated strands, such that the strands are formed from a material having a melting point based on a composition of the feedstock. In FIG. 4A, the capillary structure includes a wick 426 for dispensing liquid metal from the reservoir 114 to the substrate 130. Strands of the capillary structure are preferably formed from a material based on a wettability of the molten feedstock and on a resistance to solubility by the molten feedstock. In this design iteration, this wick and electrode assembly is surrounded by a ceramic gasket and clamped, facilitating simple MHD pumping. In the example of FIGS. 4A and 4B, the heater block halves 400-1, 400-2 join together to flank the wick 426 or capillary structure. Corresponding cavities 402-1 . . . 402-2 (402 generally) hold the polepiece of respective magnets. The heater blocks are selected for thermal conductivity.

Molybenum electrodes 406 are surface treated to make them wettable by but not soluble in the alloys of Sn, Zn and Al which are compatible with this type of electrode. The melt pool is placed in the region of highest magnetic field, where the magnet polepieces are inserted. The melt pool may be flanked by the heater/magnet enclosure or elevated above for conveyance through the capillary structure. Bores 418, 442 hold the heating element 118 and temperature sensor 142. Fastener bores for securing the halves 400 are particularly amenable to nonmagnetic bolts, such as titanium, which avoid interrupting the magnetic field for MHD propulsion of the print medium 122.

Each of the cavities 402 is configured to receive a magnetic element disposed proximate to the capillary structure and configured for generating a magnetic field around the capillary structure, such that the fluid print medium 122 is responsive to the magnetic field for augmenting a flow rate and extrusion force to help balance capillary and fluid column pressure and regulate extrusion. can be done with MHD systems or alternatively with pneumatic systems.

Figure 5:
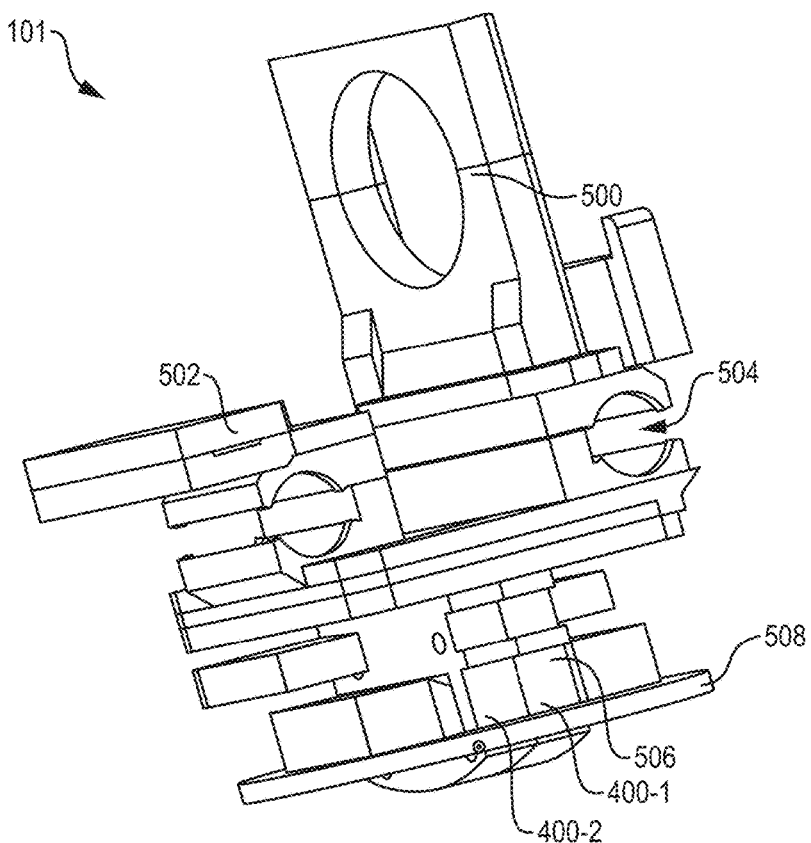
FIG. 5 shows an actuated print head for a capillary structure as in FIGS. 1-4B.

FIG. 5 shows an actuated print head for actuating a capillary structure as in FIGS. 1-4B. Referring to FIGS. 1-5, the print head 101 includes a motor attachment bracket 500 adapted for connection to a feed motor. A timing belt clamp 502 may be connected to a drive belt for print headactuation and placement of print medium on the print bed. Other extruder designs can have other drive mechanisms, like leadscrews and ballscrews. Rod receptacles 504 are receptive to linear rods or rails for sliding movement.

A heat tolerant gasket material 506 secures adhesion of the heater block halves 400 for containing the molten feedstock 114. A magnetic yoke 508 surrounds the MHD drive, now discussed further in FIG. 6.

Figure 6:
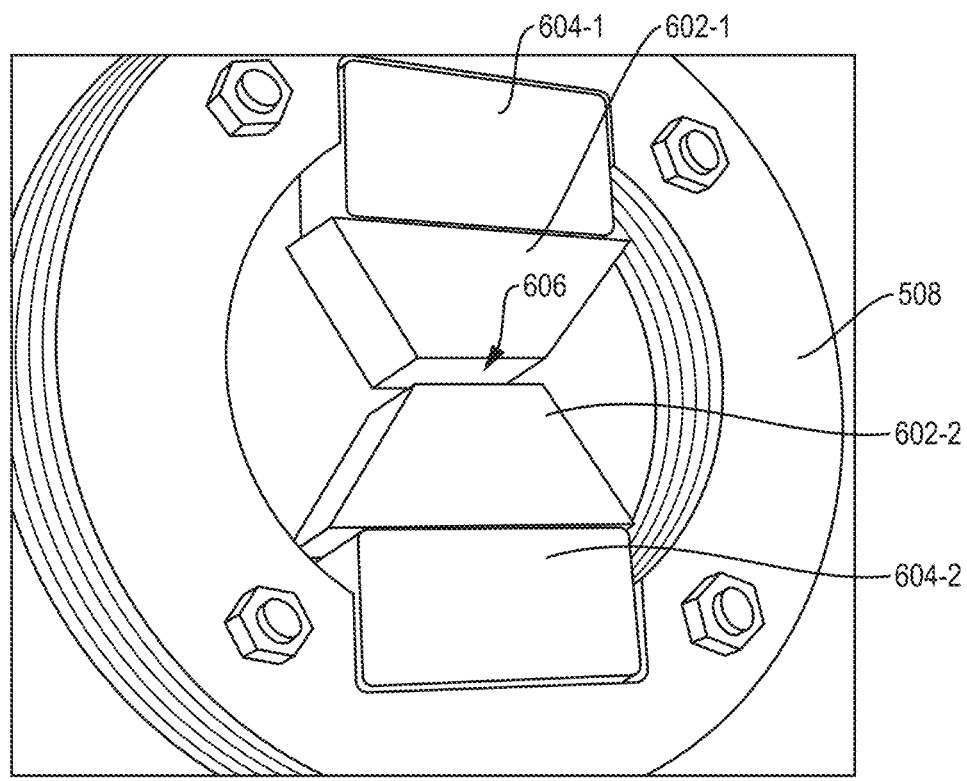
FIG. 6 shows a yoke for a magnetohydrodynamic (MHD) linear motor in the print head of FIG. 5.

FIG. 6 shows a magnetic yoke portion of the magnetohydrodynamic (MHD) linear motor in the print head of FIG. 5. Referring to FIGS. 1-6, the yoke 508 surrounds the magnetohydrodynamic (MHD) linear motor. Respective polepieces 602-1 . . . 602-2 (602 generally) project the magnetic field from each of high-temperature neodymium magnets 604-1, 604-2 (604 generally). High temperature SmCo or AlNiCo magnets may also be employed. The MHD applies extrusion pressure to increase flow of the print medium through the capillary structure to an output orifice or passage.

Figure 7:
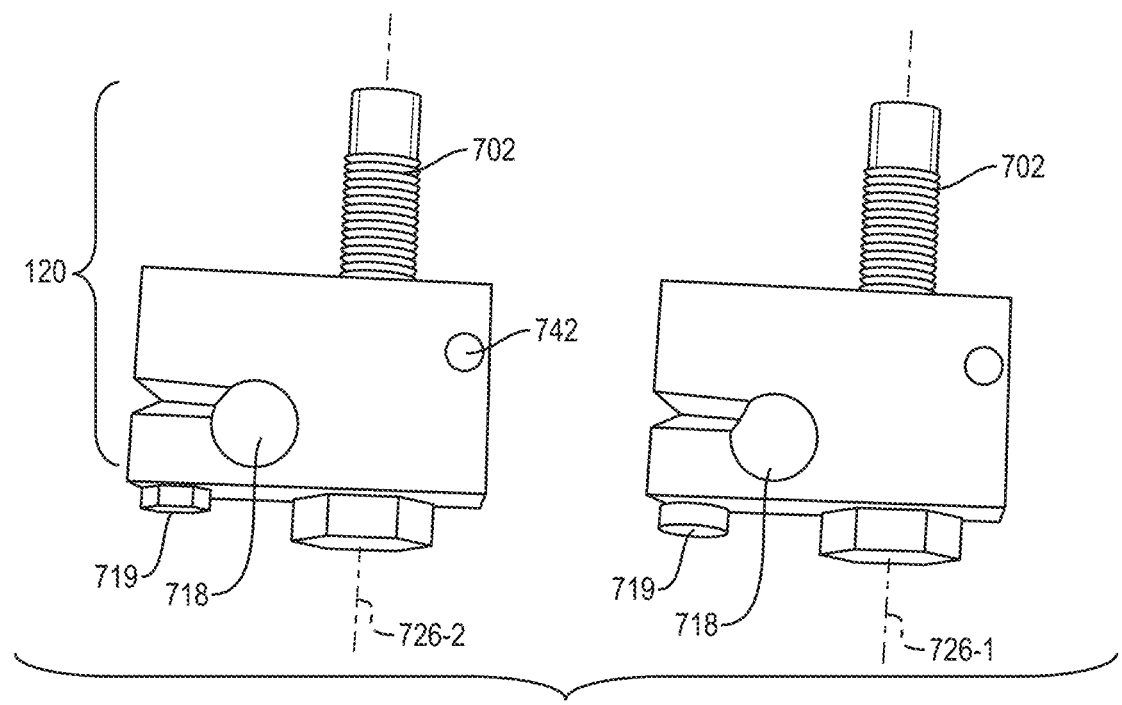
FIG. 7 shows an alternate configuration of a capillary structure as in FIG. 5-6.
Figure 8:
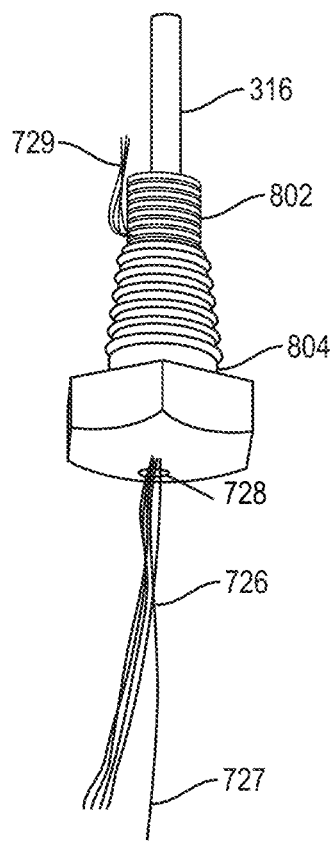
FIG. 8 shows a brush defining the capillary structure as in FIGS. 1-7.

FIG. 7 shows an alternate configuration of a capillary structure 126 and deposition head 120 as in FIG. 5-6. A threaded tube 702 receives feedstock for deposition by brushes 726-1 . . . 726-2 (726 generally). Beneficial features include a very smooth internal geometry which helps prevent molten metal from sticking, which could otherwise clog the extruder. They have also been anodized and blowtorched to create a thick protective oxide layer to further inhibit sticking. A particular configuration uses titanium for titanium dioxide's low sticking and low solubility, as well as for low thermal expansion so it grips the steel parts tightly. Brushes 726 may be of any suitable length considering the thermal gradient 209; a shorter brush generally limits cooling time. Heater apertures 718 are adapted to clamp a heater in place using screw 719, and sensor apertures 742 are adapted to receive sensors FIG. 8 shows a brush defining the capillary structure as in FIGS. 1-7. A plurality of elongated strands define a brush 726 having a deposition end 727 distal from the reservoir 112 and a bound end proximate to the reservoir, such the print medium is received by the brush at the proximate end729. In practice, shorter brushes exhibit a greater predictability and control of the thermal performance (gradient). Once inserted into the printer the bristles would be cut to size and tinned/coated with feedstock alloy. A metering protrusion 728 such as a spike or collet may be disposed for insertion between the strands near the proximate end 729 to compresses the strands for limiting capillary flow along the strands. Steel washers 802 provide a thermal contact and wetting surface for the metal wire feedstock 316 as it begins to melt. These are clamped in place when the brush nozzle is inserted into the heated deposition head or block via the threads.

In various configurations, the deposition head 120 comprises a replaceable consumable brush with a desirable number, length, arrangement and composition of bristles to enable spontaneous infiltration of the molten feedstock in between the bristles. This molten feedstock material may be guided to the surface of the workpiece and mechanically brushed into it so it may create a stronger interlayer bond, shear and break up dendrites, and remove surface oxides thereby increasing mechanical strength of the finished part. It is also helpful in keeping total brush surface area low enough that the dissolution rate of bristle material into the feedstock material is acceptably low at the working temperature of the deposition system. A shorter bristle length also ensures that the temperature gradient from the deposition head to the heated bed 150 is controllable and brush deflection introduces acceptably low error. If a bristle diameter is too large though, the bending radius achievable before plastic deformation or cracking becomes excessively large, so the diameter must also be below a certain size; typically less than ⅓ the diameter of the nozzle hole or the minimum XY spot size one wants to achieve.

A brush nozzle tip 804 has an appropriate geometry as the flat heads are heatsunk well to the heater block and the nozzle tip 804 has minimal to no taper, so the temperature at the nozzle opening is much closer to the temperature read by the temperature sensor 142 allowing for simplified system control of the heat.

Figure 9:
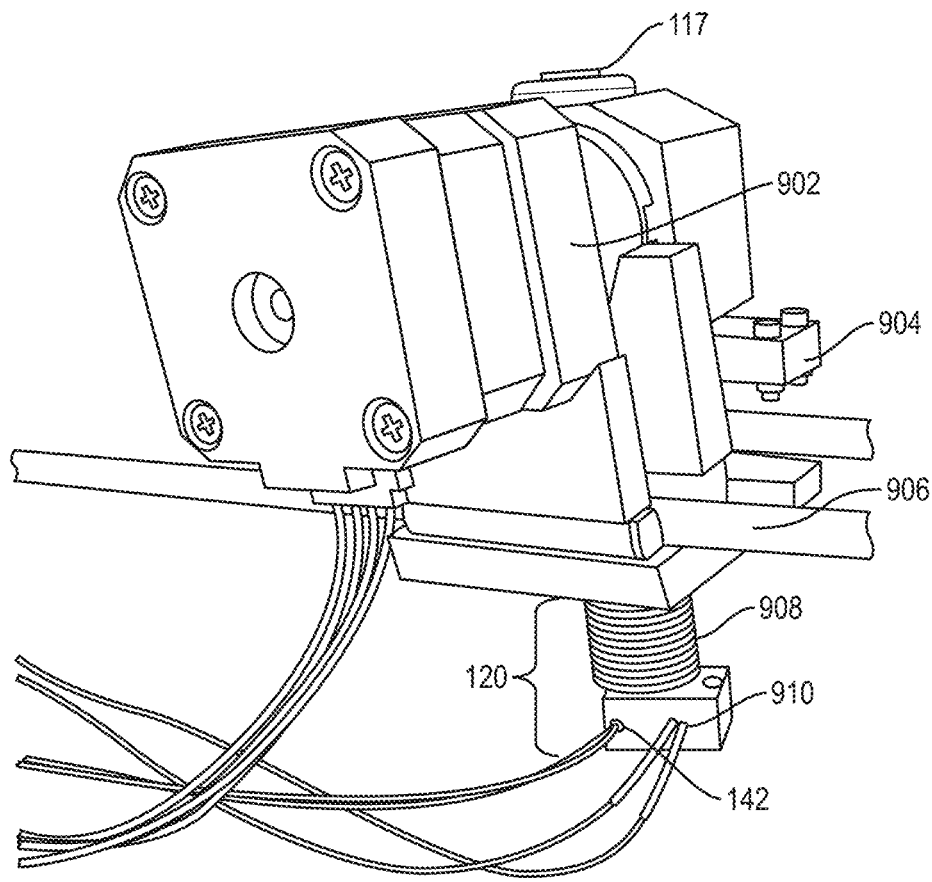
FIG. 9 shows a print head including an extruder for delivering the print medium as in FIGS. 1-8.

FIG. 9 shows a print head including an extruder for delivering the print medium as in FIGS. 1-8. Referring to FIGS. 1-9, an inlet 117 receives feedstock wire. A feedstock motor 902 advances the feedstock wire 316 for extrusion to the deposition head 120. A belt clamp 904 attaches to a drive belt for disposing the print head, aided by slides 906 and rods. A heat sink 908 isolates the heater block 910 and sensor 142. The print bed 150 is typically maintained at a temperature below a solidus of the print medium, and actuation via the belt clamp 904 and slides disposes the print head 101 relative to the print bed 140 for directing a position of the print medium 122 deposited onto the print bed. Alternate configurations may actuate the print bed 150 beneath a stationary print head 101.

Figure 10:
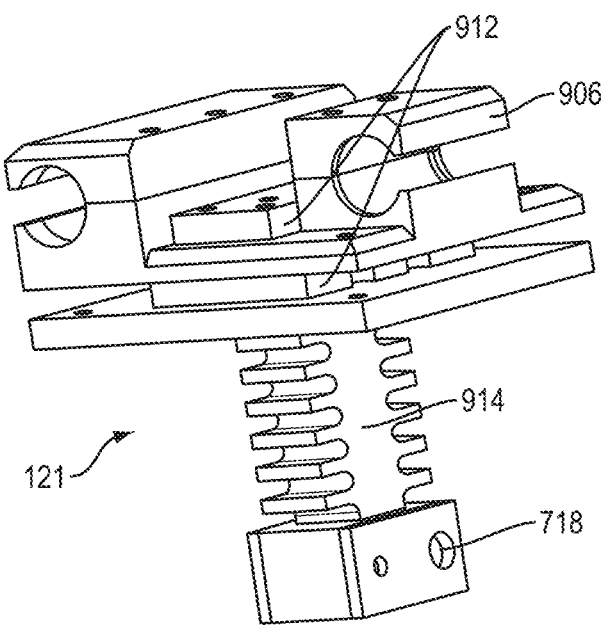
FIG. 10 shows a perspective view of a deposition end of a print head including an extruder, heater block and heat sink as in FIG. 8.

FIG. 10 shows a perspective view of a print head including an extruder and heat sink as in FIG. 8. Substantial heat is generated from heating the reservoir 112 and the conveyance 207 for accommodating the thermal gradient 209. In sum, the reservoir 112 should be at a temperature such that after a cooling effect of the thermal gradient through the capillary structure 126 to deposition, the print medium still maintains a semisolid state for avoiding clogging and to promote wetting/adhering to the accumulating substrate 130 (or print bed 150 on first layer deposition). Rod clamps/ slides 906 secure an extruder 121 coupled to the reservoir. This also helps avoid solidification of the print medium on the bristles due to cooling. Insulating shims 912 shield plastic parts form the heat of the capillary structure 126 and heater block 910. A heatsink 914 ideally sustains a temperature gradient between the hot end and the cold end of the extruder.

Other features include an extruder with a capillary structure at the nozzle tip wettable by the print medium, which aids in bonding subsequent layers of metal to each other by breaking up oxides. The sealant liquid may have a glass transition range such that its viscosity is high near the entrance of the extruder and low near the nozzle tip, to enable good sealing but prevent dripping of the sealant fluid through the nozzle. The sealant liquid may have a lower density than the metal feedstock, such that it is buoyant in the molten metal, thereby helping pin the sealant liquid in place against shear by the metal wire as it is fed in. A melt chamber near the nozzle may be wettable by the molten metal feedstock, and the region above the melt chamber towards the entrance of the extruder is wettable instead by the sealant liquid, thereby helping maintain the sealant liquid in place against shear by the metal wire as it is fed in.

Still other features include pairings of liquid-facing materials and feedstock materials where the liquid-facing material has desirable wettability by the molten feedstock material and sufficiently low solubility in the feedstock material at a working temperature to enable stable operation of systems requiring wettability for a suitable duration to complete a given industrial process, with negligible, manageable or beneficial dissolution of the liquid-facing material in the feedstock material over time.

The liquid-facing material may be heavily carburized or borided V, Nb or Ta, Ti, Zr, Hf, Cr uncarburized Mo or W, or molybdenum-manganese and the feedstock materials are alloys of ferrous or noble metals, especially iron alloys and copper alloys, and tin-zinc alloys because these systems exhibit sufficient wetting and very low dissolution rates at the working temperature when used together.

The liquid-facing material may be a boronized or carburized ferrous alloy such as maraging steel, Molybdenum or tungsten tool steel, 52100 and 52200 series steel, low alloy steel, carbon steel, a molybdenum hastelloy such as Hastelloy B2 or B3, silicon carbide or silicon nitride and where the feedstock material is an alloy of tin, zinc, aluminum, bismuth, antimony, nickel, iron, cobalt, copper, silver, manganese and microalloying additions of up to 2% each of transition metals or rare earths. Such systems tend to exhibit excellent reactive wetting and acceptable dissolution rates at the working temperature.

It can be beneficial when the feedstock material galvanically protects the liquid-facing material against oxidation to prevent reactive dewetting over time which could otherwise prevent the printing process.

A liquid-facing material of titanium, nitinol or nichrome with a feedstock material defining an aluminum alloy containing boron or silicon produces a combination that exhibits acceptable wetting and very low solubility at the working temperature due to formation of refractory silicides and borides at the solid-liquid interface.

Other configurations include a liquid-facing material of heavily carburized or borided V, Nb or Ta, Ti, Zr, Hf, Cr uncarburized Mo or W and the feedstock alloy is an alloy of Bi, Ag, Cu, Pd, Pt, Rh, Ru, Ir, Ti, Zr, Hf, Ta, Nb, which exhibit excellent mechanical properties and good biocompatability for use in medical applications, but also a sufficiently low melting point to be printed without dissolving the liquid-facing material appreciably and sufficient wettability on the liquid-facing material for processing A refractory metal carbide, diamond, diamondlike carbon or another low reactivity phase of carbon, such as lonsdaleite with boron or nitrogen doping to reduce solubility, can be used with a feedstock material of iron alloy workable at a low enough temperature that the liquid-facing material dissolves in the molten iron alloy slowly enough for processing, for which wettability is excellent for processing.

Carbon fiber, fiberglass or other ceramic fiber with low-melting-point alloys of tin, zinc, and traces of refractory metals like Ti, Cr, V, Nb, Ta, Zr, Hf and traces of rare earth metals which wet and bond strongly to the surface, produce a composite with high mechanical strength that may be remelted and bent as needed to change its shape. This provides an alternative to carbon fiber composite, in relation to carbon fiber forming/molding.

A liquid-facing material of stainless steel, Hastelloy, Stellite, Nichrome, Nickel, or an appropriate transition metal and a feedstock material of a molten salt alloy, or an alloy of borax, boric acid, glycerol and erythritol, allow soluble support material production for metal structures, or soluble structures for making casting cavities.

Since most liquid metals are substantially incompressible, pressure transients are actually much smaller than those observed in thermoplastic extrusion, enabling facile pressure-based control with low pressures. For operating at molten metal temperatures, the temperature stability constraints on these fluids are even more extreme than those found in engine oils, though they need not take as much shear over time. Preferable materials include low melting-point glasses and polymeric inorganic ionic materials. Stable cyanometalates, alkali metal salts of polymeric transition metal anions, and polymeric anion systems based on silicon, phosphorous, boron or aluminum are of particular interest; the quintessential examples being water glass and borax fluxes. In these examples, their glass transition temperatures can be modified by adjusting the ratios of borate or silicate ions relative to sodium ions nonstoichiometrically. Alloys of borax and erythritol have also been found to work for low-melting alloys, due to the high temperature stability of erythritol and the hydrogen bonding between erythritol and borate ions. Thus, hydrogen bonding may be another feasible mechanism for providing viscosity at molten metal temperature ranges. It is desirable for the sealant liquids to have a glass transition temperature range mostly below the solidus temperature of the metal wire feedstock, so that it is viscous enough that it seals to the solid metal wire before the wire has melted, and so that further down inside the extruder it acts as a thinner fluid. It is also desirable to have a section of the hot end wettable by the sealant liquid, and another wettable by the metal below, and to have the sealant liquid be less dense than the metal feedstock material. This wettability condition and buoyancy on top of the molten metal helps prevent the sealant liquid from shearing downwards along with the wire feedstock until it comes out of the nozzle, because buoyancy and surface tension will produce a restoring force which gets stronger the closer the sealant liquid gets to the tip of the nozzle, preventing the sealant liquid from dripping. To employ this type of gasket, usually a large enough melt reservoir is needed so that shear against the chamber wall does not overcome buoyancy, but reservoir geometry also plays a role. Because the sealant fluid has its lowest viscosity in the hottest section of the hot end, this restoring force will act especially quickly, approaching an equilibrium under shear from the incoming wire feedstock without allowing dripping of the sealant liquid to occur. The sealant fluid may be as thin as water (~1 centipoise) at the hottest part of the extruder, but may need to be 6 or 7 orders of magnitude more viscous at the entrance to the hot end in order to seal properly. This is achievable with a glass transition temperature and appropriate materials choices.

Certain other configurations employ a liquid glass gasket interface with a section wettable by the liquid glass and another section wettable by the liquid metal, with an internal geometry which prevents their mixing. Below are several examples of this configuration which function particularly well.

In one alternative configuration, a coarse sintered filter with open porosity, or woven metal wire filter is employed, each wettable by the metal. The woven metal wire could be embedded in a stamped sheet metal gasket, or just pressed between two sections of tubing.

In another alternative configuration a coarse sintered powder or agglomerated fiber (steel wool for example) filter wettable by the feedstock alloy, but not substantially soluble in it, is placed in the flow path of the molten feedstock alloy. This may be a disc insert or it may partially fill the reservoir inside the nozzle. The decreased capillary radius this creates at the glass gasket/liquid metal feedstock interface increases the capillary pressure resisting the flow of the glass gasket material further into the system by the 3rd power of the reduction in radius, and the capillary radius may be easily reduced by a factor of 10, making the wettability patterning three orders of magnitude more effective in that case. Also, filling the reservoir with this "sponge" for molten metal prevents air bubbles from moving up into the reservoir from the nozzle tip for the same reason. Some felt-tip and ball-point pens use a similar spongy reservoir concept for reliability. It may also grab particulates and debris that might otherwise clog the nozzle.

A further configuration employs a woven wire filter wettable but not substantially soluble in the molten feedstock alloy. The metal fabric may be clamped by threaded inserts to the heater block, and it may additionally be clamped in punched sheet metal similar to how stamped metal pins are made, to improve its durability. Again, the decreased capillary radius prevents the infiltration of the liquid glass gasket further into the system, keeping it out of the nozzle, and catches dust and particulates that would otherwise jam the nozzle. The geometry of this insert makes it reliable and easy to replace when it does wear out, and it would also be cheap to mass-produce as a consumable.

Another enhancement includes a sprung bushing or pair of sprung bushings which fits snugly around the solid filament. This operates on the solid filament, and may have an air bubble beneath it to help insulate it from the liquid metal and catch air bubbles that come up from the nozzle. This scrapes off the liquid gasket material while the wire is still solid, creating a pneumatic seal analogous to a piston ring in a car engine. Also similar to a car engine, the liquid gasket material could seep through over time, however a sufficiently low flow rate would not affect print quality. This sprung bushing/external piston ring design may also be usable in the absence of a liquid glass gasket A carbide die with a slightly smaller diameter than the solid wire feedstock can be employed for separating the liquid metal from the liquid glass gasket material and mechanically scraping off the liquid glass gasket material while the wire is still solid, before it enters the melt pool. This scrapes off the liquid gasket material from the wire and makes a better airtight seal, with less leaking than the sprung bushing design, but it may be incompatible with retraction during wire-driven volumetric extrusion.

A cavity or cavities shaped like a tesla valve(s) may be formed inline with the wire feed path where the wire is solid moving through this section, however the glass gasket material is liquid. This reduces the liquid gasket flow by maximizing the flow impedance: it may also leak, but within bounds acceptable to print quality.

Each of these alternatives impedes or fully stops the wire from carrying liquid gasket material into the nozzle, while forming an adequate pneumatic seal so that pressure can be applied to the molten feedstock alloy by the inlet wire, and so that metal will not simply leak out of the nozzle when no other forces are being applied to it.

In other alternative configurations, the liquid glass gasket concept disclosed above may be applied to any viscous liquid that:

- is viscous at the operating temperature but does not necessarily need to be glass. Molten salts and deep eutectic solvents may be viscous enough and stable at the operating temperature, but are not technically glassy;
- may have solid particulates to help increase viscosity as long as they are sufficiently small. Dispersed particles can make a fluid act more viscous than it already is, and introduce a yield stress, which prevents the fluid gasket from getting sheared and carried along with the wire as much but also forms a better seal. If the particles are substantially smaller than the nozzle diameter (>200X smaller), then it is very unlikely that a clog will occur.
- Behaves as a fluxing agent to the solder and preventing oxidation or dissolving oxides off the metal surface at the operating temperature of the device. This prevents oxide particulates from accumulating and clogging the nozzle, and is generally a nice feature to have. It is also beneficial if the flux becomes inert at lower temperatures, so that it does not cause corrosion later.
- Is sufficiently thermally stable at the operating temperature of the device to not denature, pytolize, dissociate, etc. enough to form solids which clog the nozzle. If the liquid glass gasket chemically reacts in the nozzle, that can easily clog it, so it is preferable to have a fluid that will be stable if it does get into the nozzle.
- Is substantially fluid at the nozzle temperature, so that it does not clog the nozzle. With borax and glycerol for example, the glycerol evaporates out and then the borax solidifies, clogging the nozzle. The chemicals are stable, but evaporation forces the result. The two penultimate bullet points are about having the liquid sealant/gasket material fail safely if it does get in the nozzle.

Figure 11:
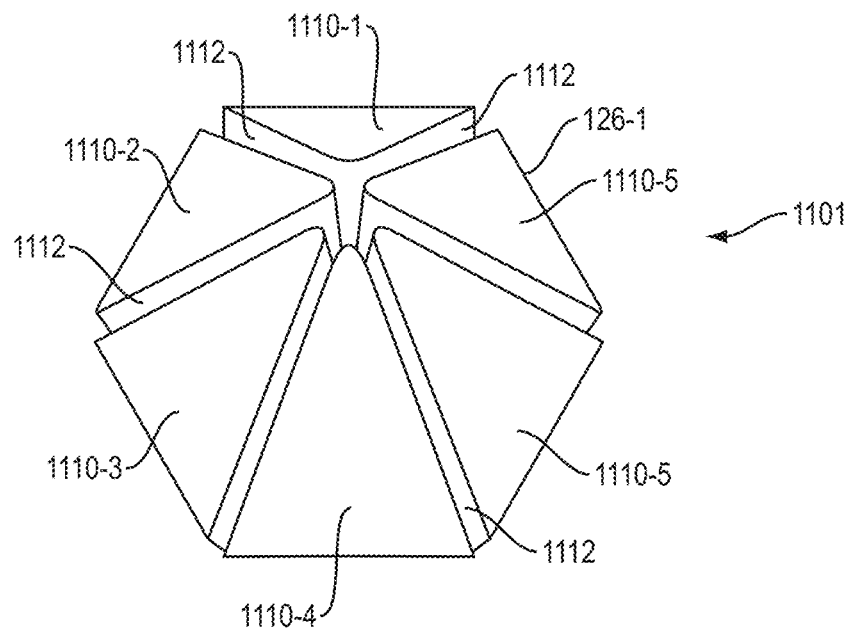
FIG. 11 shows an alternate capillary structure.

FIG. 11 shows an alternate capillary structure 126. Referring to FIGS. 1 and 11, a polyhedron shape defines an alternate capillary structure 126-1. A polyhedron, pyramidal shape 1101 has a plurality of sides 1110-1 . . . 1110-N based on the number of sides of the polygon. Capillary spaces 1112 between each side and corresponding structure define a series of "slices" through the pyramidal shape 1101 for allowing print medium to flow. In operation, the polyhedral shape behaves like the nib of a fountain pen, allowing metal to flow freely down the capillaries without jamming to the bottom of the structure. Flow may be enhanced by subtle vibration or other factors.

Figure 12:
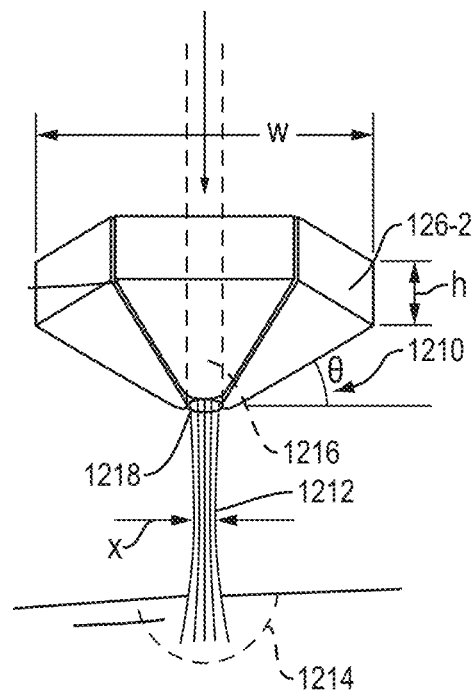
FIG. 12 shows a brush configuration.

FIG. 12 shows a brush configuration. Referring to FIG. 12, the capillary structure 126 is defined by a brush snozzle 126-2 having a width W and height h. In a particular configuration of the brush nozzle, w>2h, but with sufficient simulation, testing and engineering, other geometries may be employed. A slope angle 1210 of the nozzle component of the brush nozzle defines the sides; in the preferred embodiment, this angle is <30 degrees, but with sufficient simulation, testing and engineering, any suitable geometries may be employed. At a transition distance 1212, shown by position X defines the linear position along the brush where the feedstock alloy temperature falls below its liquidus temperature. Position X is between the nozzle opening and the print substrate, to prevent granular jamming of the nozzle. In optimal conditions, the brush nozzle 126-2 creates a small melt zone 1214 under it, so that it can mechanically disrupt the oxide layer on the metal surface for good metallurgical bonding between print layers. Vibration may be utilized to aid bonding, but not ultrasonic vibration because ultrasonic vibration greatly increases dissolution rates of materials in molten metals. In the internal geometry of the brush nozzle, before the nozzle opening, a bore 1216 for the print medium may be diverging towards the nozzle tip 1218 to further inhibit granular jamming.

Figure 13:
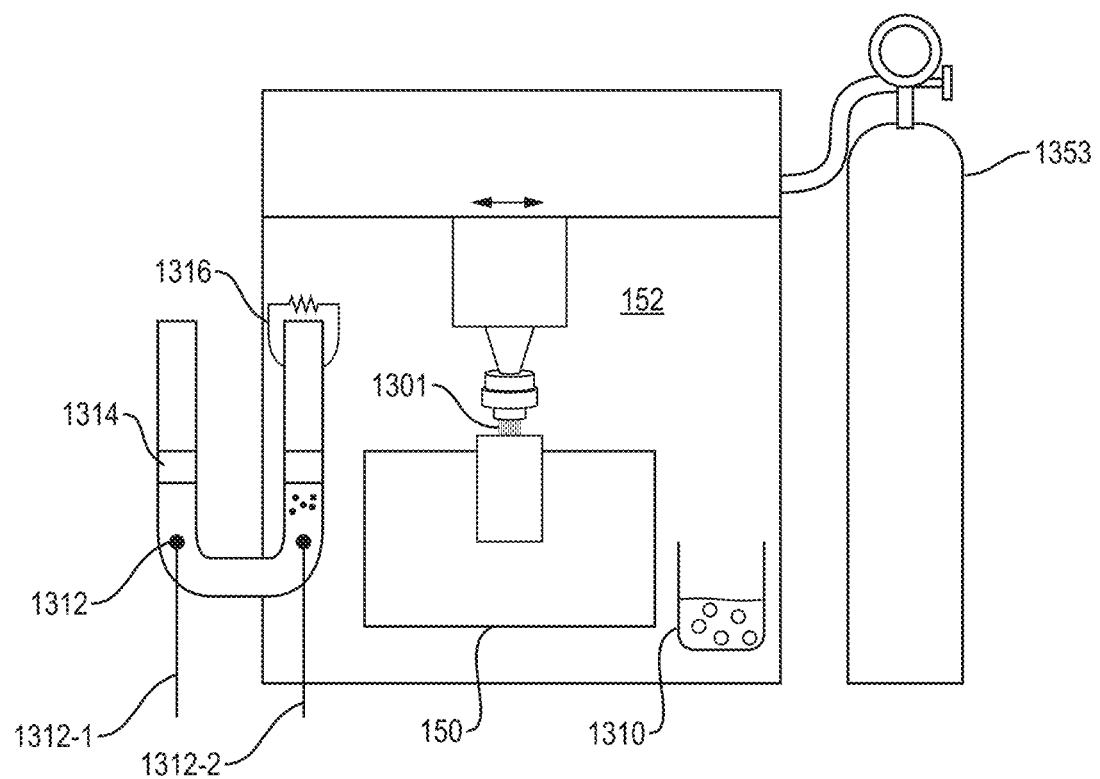
FIG. 13 shows a schematic system view similar to FIGS. 1 and 3.

FIG. 13 shows a schematic system view similar to FIGS. 1 and 3. Referring to FIGS. 1, 3, and 13, the oxygen mitigation control 153 may be an inert gas source 1353 for filling a print enclosure or region 152 with inert gas or directing inert gas flow over the brush nozzle 126-2 as in welding. This reduces oxide formation and enables the printing of more reactive metals with this technology. An extruder and brush nozzle combination 1301 applies material to the workpiece or print bed 150. A motion system moves the extruder and brush nozzle relative to the workpiece to enable construction of the part. This patent covers the extruder system, not the motion system though; so motion system implementation specifics are not relevant here. Hygroscopic getters 1310 and desiccants absorb water may optionally be added to the enclosure to improve print quality. The print substrate 130 comprises the print bed 150 and accumulating workpiece. Nonreactive wetting, or reactive wetting which produces brittle intermetallics, enables easy removal of the workpiece at the conclusion of printing. Print bed and workpiece/feedstock materials are chosen accordingly. One or more electrodes 1314 are operable for electrolyzing water. A positive anode 1312-1 is placed outside of the enclosure and produces oxygen, which is vented to the environment. The negative electrode 1312-2 produces hydrogen and this is placed within the enclosure, so the hydrogen enters the enclosure. An electrolysis system is convenient for inert atmosphere processing, because it removes the requirement for regular, potentially expensive shipments of inert gas, and makes the system far more user-friendly. In another embodiment of this system, the electrolytic system can be applied directly to the brush nozzle and workpiece, with the combination being cathodically protected to remove oxides. An appropriate molten salt may also be employed instead of water, at sufficiently high temperatures. Covering the electrolysis water is an immiscible oil layer 1314 that prevents water evaporation into the enclosure. A flashback arrestor may aid in dispersing and minimizing the risk of oxygen concentration. At the opposed end, a resistor wire 1316 with catalytic surface properties, for example composed of nickel or coated in palladium or platinum, reacts hydrogen with oxygen and $CO_2$, and potentially even nitrogen in the enclosure, to remove these reactive gases from the enclosure before or during printing. An oxygen sensor may be employed to detect or estimate levels of reactive gases in the enclosure. For larger configurations, a solid oxide fuel cell may be employed to recycle a large percentage of the energy employed in electrolysis While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A molten metal print deposition device, comprising
   a reservoir in fluid communication with a deposition head for controlled deposition of a print medium defined by molten feedstock;
   a capillary structure adapted to maintain the molten feedstock from the melt reservoir in a fluidic state for directing and depositing the feedstock onto a substrate; and
   a thermal source for maintaining the molten feedstock at a temperature above the liquidus of the print medium during deposition, the capillary structure further including a plurality of elongated strands, the strands formed from a material having a melting point based on a composition of the feedstock.

2. The device of claim 1 further comprising strands formed from a material based on a wettability of the molten feedstock and on a resistance to solubility by the molten feedstock.

3. The device of claim 1 further comprising:
   a control circuit for heating the reservoir;
   a temperature sensor connected to the control circuit and in communication with the reservoir; and
   melting logic for heating the reservoir based on a temperature signal from the temperature sensor and a thermal differential of the molten feedstock during deposition.

4. The device of claim 1 further comprising: a print bed, the print bed maintained at a temperature below a solidus of the print medium; and an actuator adapted for disposing the capillary structure relative to the print bed for directing a position of the print medium deposited onto the print bed.

5. The device of claim 1 wherein the thermal source is configured for maintaining a thermal gradient of the print medium between the reservoir to the substrate to accommodate a cooling effect while maintaining a temperature above the liquidus of the print medium.

6. The device of claim 1 further comprising an atmospheric enclosure around a print volume defined by an exit of the capillary structure for depositing the print medium and a print bed accumulating the deposited print medium, the atmospheric enclosure having an oxygen mitigation control for reducing oxygen present in the print volume.

7. The device of claim 6 wherein the oxygen mitigation control further comprises an electrolysis source, water, and an oil layer on the water for displacing oxygen based on hydrogen fueled electrolysis.

8. The device of claim 1 further comprising a magnetic element disposed proximate to the capillary structure and configured for generating a magnetic field around the capillary structure, the print medium responsive to the magnetic field for augmenting a flow rate.

9. The device of claim 8 wherein the magnetic element further comprises a magnetohydrodynamic (MHD) linear motor.

10. The device of claim 1 further comprising a baffle suspended in the reservoir above an outflow to the capillary structure, the baffle extending over an area above the outflow for dispersing semisolid particles of the molten feedstock for avoiding an accumulation and clogging of the outflow by the particles.

11. A molten metal print deposition device, comprising:
  a reservoir in fluid communication with a deposition head for controlled deposition of a print medium defined by molten feedstock;
  a capillary structure adapted to maintain the molten feedstock from the melt reservoir in a fluidic state for directing and depositing the feedstock onto a substrate;
a thermal source for maintaining the molten feedstock at a temperature above the liquidus of the print medium during deposition
  a feedstock transport configured for transporting feedstock into the reservoir; and
  a seal at an entry of the feedstock into the reservoir, the seal forming a pressure vessel defined by the reservoir, the seal and the capillary structure, a pressure in the pressure vessel moderating a flow rate of the molten feedstock via the capillary structure.

12. The device of claim 11 further comprising:
  a wire feed for transporting a feedstock wire into the reservoir, the seal surrounding the wire; and
  a sealing liquid between a surface of the feedstock wire and the seal.

13. The device of claim 1 wherein the plurality of elongated strands define a brush having a deposition end distal from the reservoir and a bound end proximate to the reservoir, the print medium received by the brush at the proximate end, further comprising a metering protrusion disposed for insertion between the strands at the proximate end, the metering protrusion compressing the strands for limiting capillary flow along the strands.

14. The device of claim 11 further comprising:
  an extruder coupled to the reservoir for introducing feedstock in a non-molten state into the reservoir; and
  a sealant liquid disposed around the seal, the sealant liquid having a solidus temperature below a melting point of the feedstock.

* * * * *